March 29, 1932.  P. PELLISCHEK  1,851,110
WEIGHING SCALE
Filed Jan. 13, 1931
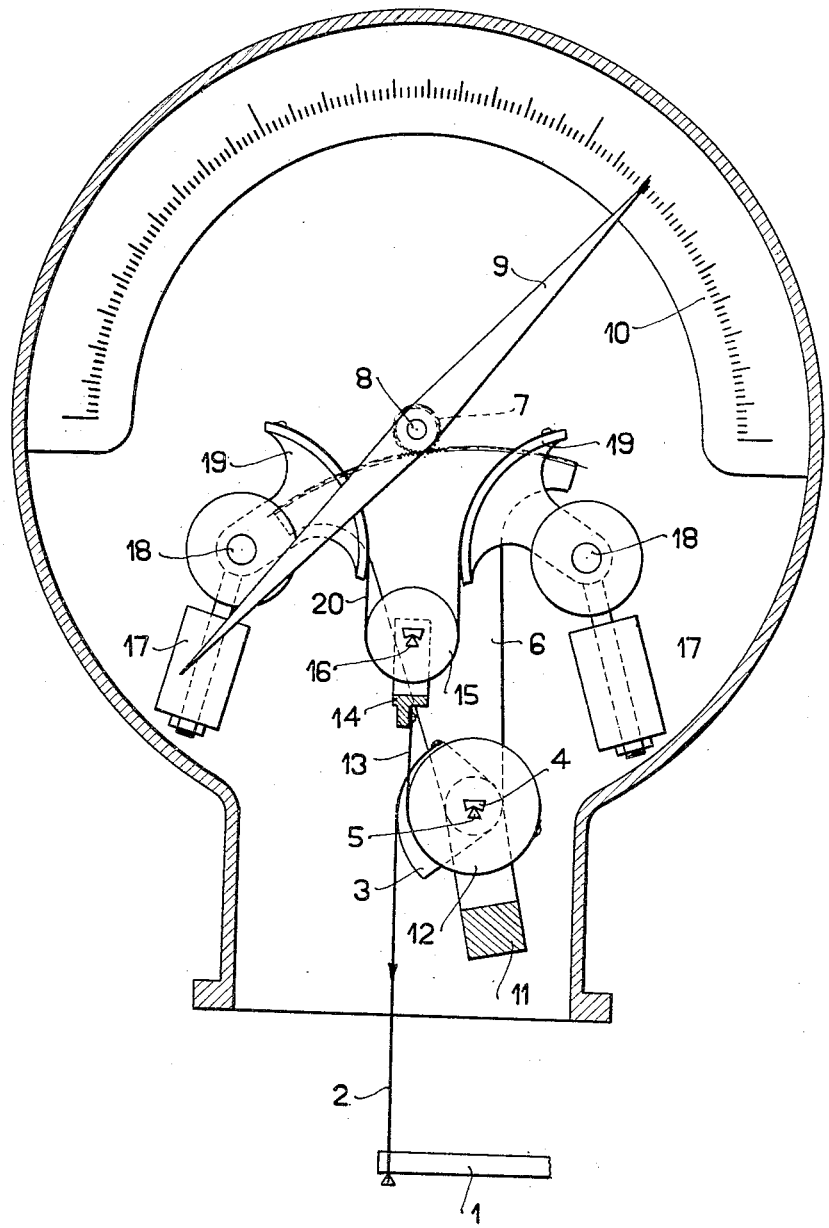
Inventor,
Paul Pellischek,
By Henry Orth Jr, atty.

Patented Mar. 29, 1932

1,851,110

UNITED STATES PATENT OFFICE

PAUL PELLISCHEK, OF VIENNA, AUSTRIA, ASSIGNOR TO FIRM MAATSCHAPPIJ TOT EXPLOITATIE VAN APPARATEN EN OCTROOIEN "BERJO" TE'S GRAVENHAGE, OF THE HAGUE, NETHERLANDS, A COMPANY OF THE NETHERLANDS

WEIGHING SCALE

Application filed January 13, 1931, Serial No. 508,491, and in Great Britain January 24, 1930.

This invention relates to weighing scales in which the total weight of the load is completely counterbalanced by one or more pendulum weights, and more particularly to weighing scales of the type in which the load-counterbalancing system comprises two pendulum weights moving in opposite directions and a compensating roller disposed between said weights.

To render weighing scales of the type above indicated less sensitive to deviations of its setting from the exact horizontal position, it has been proposed to make the whole of the mechanism perfectly symmetrical in all its principal parts. This arrangement requires all the parts of the mechanism to be duplicated and, therefore necessitates a multiplication of the joints and axles, bearings and other members.

The main object of the present invention is to provide an arrangement in which insensitivity of the weighing scale to deviations from the horizontal position can be obtained without duplicating all the parts. With this end in view, the invention consists in that in a pendulum balance of the class referred to a completely counterbalanced driving sector for the pointer is provided, this sector being connected to a lever which transfers the load acting upon the scale pan as well as to the compensating roller of the said counterbalancing arrangement.

With this arrangement only those displacements of the pendulum weights caused by variations of load on the scale platform are transferred to the driving sector, the displacements of the pendulum weights resulting from inclination or displacement of the scale being completely compensated within the pendulum weight system. Inaccurate readings of weights through displacement of the balance from the horizontal position are thus obviated.

The arrangement according to the invention moreover provides the further advantage that shocks to which the balance may be subjected during the weighing operation also do not affect the accurate reading of the weight, since both pendulum weights would then be rotated in the same direction, whereby the compensating roller would merely be rotated, but not displaced. The driving sector is acted upon only when the pendulum weights are rotated about their pivots in opposite directions and this particular displacement of the pendulum weights is caused solely by variations of the load in the scale pan.

In the accompanying drawing one embodiment of the invention is shown by way of example in elevation.

To the lever 1 which is connected with the scale pan in any desired manner a tension band or similar device 2 is attached the upper end of which is connected to an excentric 3. The latter is provided with planes 4 resting on knife edges 5 and is fixedly connected with a driving or toothed sector 6 which drives, in the usual manner, the small gear wheel 7 mounted on the shaft 8 of the pointers 9 travelling over the dial 10. The driving sector 6 is counterbalanced by a counterweight 11 in such a way that the centre of gravity of the whole rotating system is located in the axis of rotation, that is to say in the knife edges 5. The sector is thus in neutral equilibrium. In addition to the excentric 3, there is fixedly connected to the sector 6 a cylindrical drum 12 concentric with the axis of rotation, from the periphery of which runs a band 13 connected at its upper end to a yoke 14. This yoke surrounds the compensating roller 15 and is suspended on the same by means of knife edges 16.

The load-counterbalancing system comprises two pendulum weights 17 pointing in opposite directions and rotatable about shafts 18. On these shafts there are also mounted two sectors 19, to the peripheries of which are connected the ends of a band 20 running round the compensating roller 15.

If the balance is tilted at any angle or subjected to shocks during the weighing operation—especially in a horizontal direction—the pendulum weights are displaced in the same direction and the compensating roller 15 is thus merely rotated and not displaced. The driving sector 6 and the pointer 9 will thus remain stationary. The driving sector is displaced only when the pendulum weights swing outwards in opposite directions through variations of the load acting on the lever 1.

As will be seen from the foregoing in the balance according to the present invention, only the pendulum weight itself is duplicated all the other parts being single members only. Although there is only a single duplication of parts the balance is so insensitive to obliquity and displacement that it can even be transported while in use.

What I claim is:—

A pendulum balance, comprising a load-counterbalancing arrangement which consists of two pendulum weights moving in opposite directions and a compensating roller arranged between these weights, a completely counterbalanced sector adapted to drive the pointer of the scale and directly connected to said compensating roller, and a lever connected with said sector adapted to transfer the load acting upon the scale pan, whereby only those displacements of the pendulum weights which are caused by variations of load actuate said driving sector.

In testimony that I claim the foregoing as my invention, I have signed my name.

PAUL PELLISCHEK.